(12) United States Patent
Shyu et al.

(10) Patent No.: US 8,102,600 B2
(45) Date of Patent: Jan. 24, 2012

(54) STACKED DISK-SHAPED OPTICAL LENS ARRAY, STACKED DISK-SHAPED LENS MODULE ARRAY AND METHOD OF MANUFACTURING THE SAME

(75) Inventors: San-Woei Shyu, Taipei (TW);
Huang-Chang Chen, Taipei (TW);
Chih-Peng Wang, Taipei (TW);
Te-Cheng Lin, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/880,966

(22) Filed: Sep. 13, 2010

(65) Prior Publication Data

US 2011/0063723 A1 Mar. 17, 2011

(30) Foreign Application Priority Data

Sep. 11, 2009 (TW) .............................. 98130846 A (51) Int. Cl.
*G02B 27/10* (2006.01)

(52) U.S. Cl. .................... 359/622; 359/621; 359/900

(58) Field of Classification Search .................. 359/619, 359/621, 622, 626, 900
See application file for complete search history.

(56) References Cited

U.S. PATENT DOCUMENTS

| 7,183,643 B2 | 2/2007 | Gibson et al. |
| 7,187,501 B2 | 3/2007 | Wakisaka |
| 7,885,006 B2 * | 2/2011 | Yamamura ..................... 359/619 |
| 2006/0249859 A1 | 11/2006 | Eiles et al. |
| 2007/0070511 A1 | 3/2007 | Lee et al. |
| 2008/0093756 A1 | 4/2008 | Nishimoto et al. |

FOREIGN PATENT DOCUMENTS

| JP | 20000227505 | 8/2000 |
| JP | 2000321526 | 11/2000 |
| JP | 2001042104 | 2/2001 |
| JP | 2001194508 | 7/2001 |
| JP | 2003071874 | 3/2003 |
| JP | 2008230005 | 10/2008 |
| TW | M343166 | 10/2008 |
| WO | WO2008011003 | 1/2008 |

\* cited by examiner

*Primary Examiner* — Jack Dinh (74) *Attorney, Agent, or Firm* — Muncy, Geissler, Olds & Lowe, PLLC (57) ABSTRACT

A stacked disk-shaped optical lens array, a stacked disk-shaped lens module array and a method of manufacturing the same are revealed. The stacked disk-shaped optical lens array is produced by stacked disk-shaped optical lens modules whose optical axis is aligned. The stacked disk-shaped lens module array is produced by a stacked disk-shaped optical lens array whose optical axis is aligned by an alignment fixture, stacked and assembled with required optical element arrays. In the stacked disk-shaped lens module array produced by this method, the lens optical axis is aligned precisely. Moreover, the manufacturing process is simplified and the cost is reduced.

3 Claims, 9 Drawing Sheets

STACKED DISK-SHAPED OPTICAL LENS ARRAY, STACKED DISK-SHAPED LENS MODULE ARRAY AND METHOD OF MANUFACTURING THE SAME

BACKGROUND OF THE INVENTION

The present invention relates to a stacked disk-shaped optical lens array, a stacked disk-shaped lens module array and methods of manufacturing the same, especially to a stacked disk-shaped optical lens array having at least two disk-shaped optical lens arrays stacked precisely with a required disk-shaped optical element array to produce a stacked disk-shaped lens module array used in LED arrays, lens module arrays of solar energy conversion systems, etc.

The resin injection-compression molding technology has been widely applied to various optical produces with high requirements of precision, size and optical properties such as DVD, CD-ROM, or optical lenses. The resin injection-compression molding combines two techniques-injection molding and compression molding. A mold compression process is added into general injection molding processes. That means during the beginning of the resin casting process, the mold is not closed completely. The mold is closed by pressure after part of resin being filled into a mold cavity. The pressure is applied to melt resin material inside the mold cavity through the casting area. The processes are called "closing and clamping mold operations" and the mold cavity filling is finished by compression molding. Compared with injection molding, the residual stress is reduced, the difference in refractive index is decreased, and the optical lens element is with higher accuracy. As shown in US2008/0093756, JP2008-230005, JP2003-071874 etc., optical lens elements are produced by such molding method.

Figure 1:
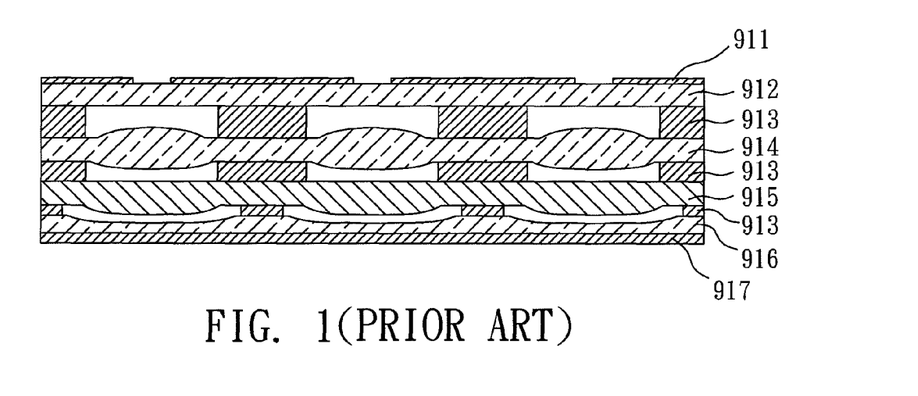
FIG. 1 is a schematic drawing showing a conventional stacked optical lens array.

Optical lenses have been broadly used in camera lenses, LED distributing lens and concentrating lenses of solar energy conversion systems. In manufacturing optical lens arrays, JP2001194508 disclosed a method for manufacturing plastic optical lens array while TW M343166 revealed a method for manufacturing glass optical lens array. In manufacturing lens module arrays, U.S. Pat. No. 7,183,643, US2007/0070511, WO2008011003 etc revealed a wafer level lens module. Refer to FIG. 1, an ordinary optical lens module array includes an aperture 911, a cover glass 912, a plurality of optical lens elements and an IR cut glass 917. As shown in figure, it is a three-piece type optical lens set includes a first optical lens element, a second optical lens element and a third optical lens element 914, 915, 916, spaced by a spacer 913. After assembly, a lens module array is produced.

Figure 2:
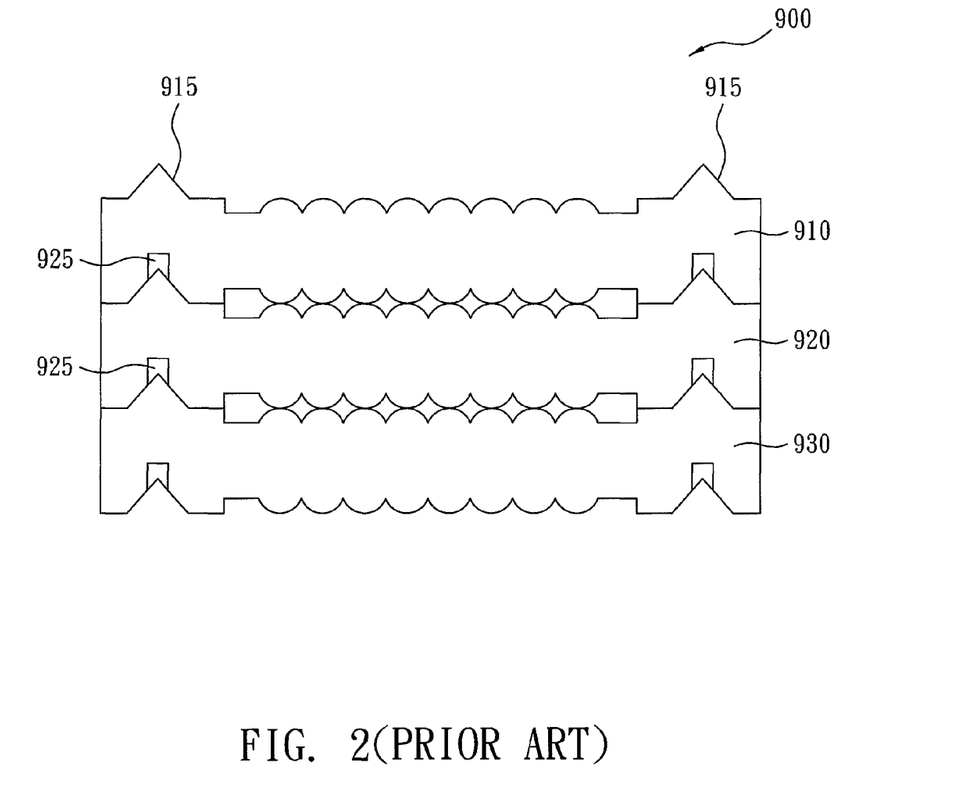
FIG. 2 is a schematic drawing showing another conventional stacked optical lens array.
Figure 3:
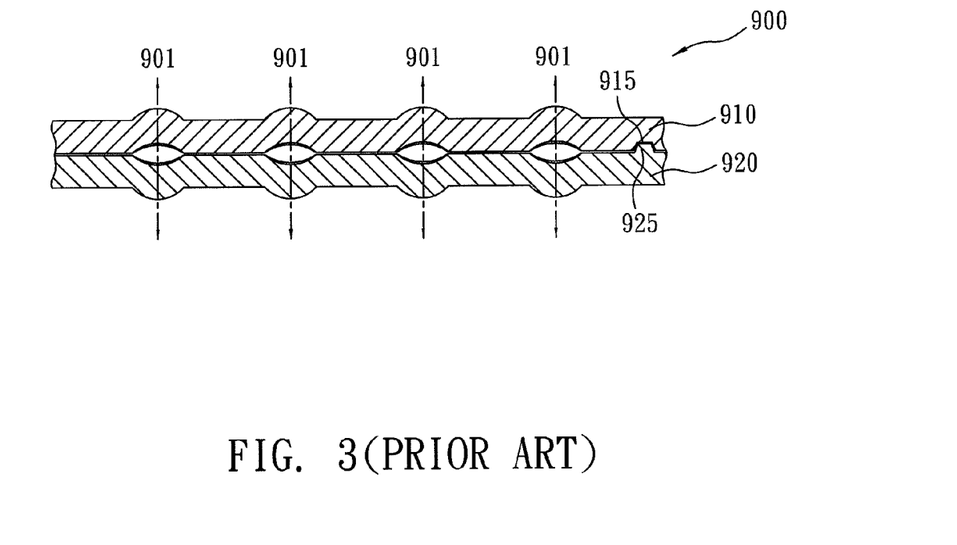
FIG. 3 is a schematic drawing showing a further conventional stacked optical lens array.

While assembling optical lenses or producing optical lenses, a plurality of optical lens elements with different refractions is assembled with certain air spacing for images. Thus optical axis of each optical lens element needs to be aligned precisely so as to prevent reduced resolution. Moreover, there is a certain distance arranged between the optical lens elements. It takes a lot of time and efforts to run processes and precise alignment. Thus the production can't be boosted and the cost can't be reduced. Especially the assembling of the optical lens array will influence the optical effects once the optical axis of the optical lens array is not aligned. Thus the alignment of the optical lens array is getting more important and more complicated. Refer to US2006/0249859, it revealed fiducial marks generated by infrared rays to assemble wafer level lens module. Refer to JP2000-321526, and JP2000-227505, a SELFOC lenses array is produced by assembling of height with cervice. Refer to JP2001-042104, recesses with different depth are used to prevent warpage and deformation of the micro lens array. As to U.S. Pat. No. 7,187,501, cone-shaped projection is used to stack multiple optical lens elements and produce a plastic optical lens array. Refer to FIG. 2, an optical lens module array 900 includes three optical lens arrays 910, 920, 930, each disposed with projections 915 and holes 925. By the projections 915 connected with the holes 925, the optical lens module array 900 is produced. However, the projections 915 and the holes 925 are used for mechanical positioning not for optical alignment. Thus the optical axis of each optical lens element of the optical lens array is not aligned. Furthermore, refer to FIG. 3, an optical lens module array 900 consists of two glass lens arrays 910, 920, respectively with at least one alignment cavity 915 and at least one alignment pin 925. By connection of the alignment cavity 915 with the alignment pin 925, the optical lens module array 900 is formed. The alignment cavity 915 and the alignment pin 925 can be integrated with the glass lens arrays 910, 920 by glass molding. And an optical axis of each optical lens element of the optical lens module array is aligned.

The optical lens module array used in lens assemblies of LED (light emitting diode) light sources, lens assemblies of solar energy systems, and lens modules of mobile cameras generally includes a plurality of optical lens arrays with different optical surfaces. In conventional plastic optical lens arrays assembled by projections and holes, the plastic optical lens arrays are produced by injection molding, the size of the projections and holes may change due to material shrinkage. Thus the alignment accuracy is difficult to be improved. And the optical axis of each optical lens in the plastic optical lens array is shifted and difficult to be aligned. This results in restrictions on use.

A disk-shaped optical lens array produced by resin injection-compression molding and resin casting process through a center of a disk has low inner stress and high accuracy. Moreover, a disk hole arranged at a center of the disk-shaped optical lens array is used for alignment while assembling. Thus an easy method of manufacturing an optical lens module array with high accuracy by the disk-shaped optical lens array is provided. The produced optical lens module array is used in LED arrays or lens module arrays of solar energy conversion systems, matching requirements of yield rate and production of mass production.

SUMMARY OF THE INVENTION

Therefore it is a primary object of the present invention to provide a stacked disk-shaped optical lens array applied to optical lenses of optical systems such as LED lens module arrays or lens module arrays of solar energy conversion systems.

In order to achieve above object, a stacked disk-shaped optical lens array of the present invention includes at least two disk-shaped optical lens arrays stacked and assembled by glue with a preset interval. The disk-shaped optical lens array produced by resin injection-compression molding is a round disk with a disk hole at a center thereof, but not limited to the round shape. The disk-shaped optical lens array includes a first optical surface and a second optical surface, respectively with corresponding optical divisions and non-optical divisions. The optical divisions of the first optical surface and of the second optical surface form a plurality of optical lens elements arranged in an array. At least one glue groove is disposed on a periphery of the non-optical division of at least one disk-shaped optical lens array. After the glue in the glue groove being cured, the two adjacent disk-shaped optical lens arrays are fixed and connected with each other to form a stacked disk-shaped optical lens array. Moreover, at least one alignment fixture is disposed on a periphery of the non-optical division of at least one disk-shaped optical lens array. By the alignment fixture, the two adjacent disk-shaped optical lens arrays are stacked and assembled precisely and optical axis of each optical lens element is aligned.

It is another object of the present invention to provide a stacked disk-shaped optical lens array applied to optical lenses of optical systems while the stacked disk-shaped optical lens array includes at least two disk-shaped optical lens arrays fixed and assembled by glue with a present interval. The disk-shaped optical lens array produced by resin injection-compression molding is a round disk with a disk hole at a center thereof, but not limited to the round shape. The disk hole of at least one disk-shaped optical lens array is disposed with a guiding structure by which the two disk-shaped optical lens arrays are stacked and assembled. Moreover, a spacer is arranged between two disk-shaped optical lens arrays to have designed air spacing. The spacer is fixed and assembled with adjacent disk-shaped optical lens array by glue.

It is a further object of the present invention to provide a stacked lens module array including a stacked disk-shaped optical lens array and at least one optical element array, connected with each other by glue with a preset interval. The optical element array includes a plurality of optical elements arranged at a disk-shaped substrate in an array form and the optical elements correspond to a plurality of optical lens elements of the stacked disk-shaped optical lens array. The optical element array can be an optical lens array, a disk-shaped spacer, a disk-shaped aperture, a disk-shaped cover glass, an IR-cut glass, a disk-shaped circuit substrate with an image capture device array, a disk-shaped circuit substrate with a photoelectric device array, and a disk-shaped circuit substrate with a light emitting diode (LED) array.

It is a further object of the present invention to provide a method of manufacturing a stacked disk-shaped optical lens array and a stacked lens module including following steps:

S1: providing an injection-compression mold having an upper mold and a lower mold respectively with optical molding surfaces; the upper mold and/or the lower mold is disposed with an alignment fixture molding surface respectively and a material inlet is arranged at a center of the upper mold or the lower mold;

S2: producing a primary product of a disk-shaped optical lens array by resin injection-compression molding and cutting off a down sprue stick of the primary product of a disk-shaped optical lens array to produce a disk-shaped optical lens array; the disk-shaped optical lens array includes a plurality of optical lens elements formed on optical division while non-optical division of the disk-shaped optical lens array is arranged with glue grooves and alignment fixtures;

S3: producing another disk-shaped optical lens array by the above steps and this disk-shaped optical lens array can be without the glue groove;

S4: coating glue on the glue groove of two adjacent disk-shaped optical lens arrays and then stack and assemble the two disk-shaped optical lens arrays by guiding structures;

S5: aligning optical axes of two adjacent disk-shaped optical lens arrays by the alignment fixtures so that the optical axes are aligned with optical center;

S6: curing the glue to form a stacked disk-shaped optical lens array; thereby at least two disk-shaped optical lens arrays are assembled precisely to form a stacked disk-shaped optical lens array whose optical center is aligned precisely;

S7: coating non-optical division of the stacked disk-shaped optical lens array with glue for being assembled and stacked with other optical element arrays so as to form a stacked disk-shaped optical lens array with the optical element arrays after curing of the glue;

According to the present method, precise stacked optical lens arrays and stacked disk-shaped lens module arrays are produced at a time. Thus precise assemblies are obtained and mass production is achieved.

DETAILED DESCRIPTION OF THE PREFERRED EMBODIMENT

Figure 4:
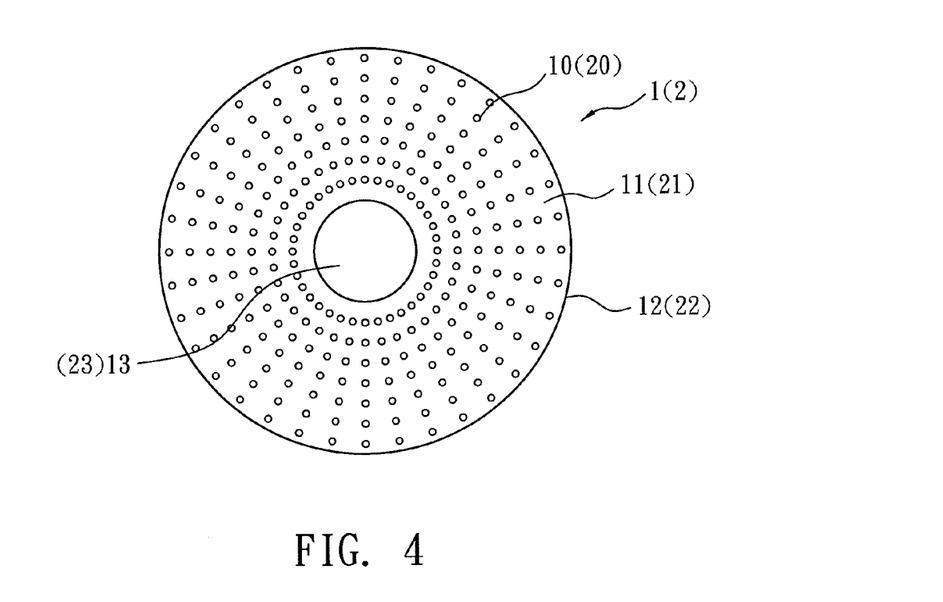
FIG. 4 is a schematic drawing showing an embodiment of a disk-shaped optical lens array according to the present invention.
Figure 10:
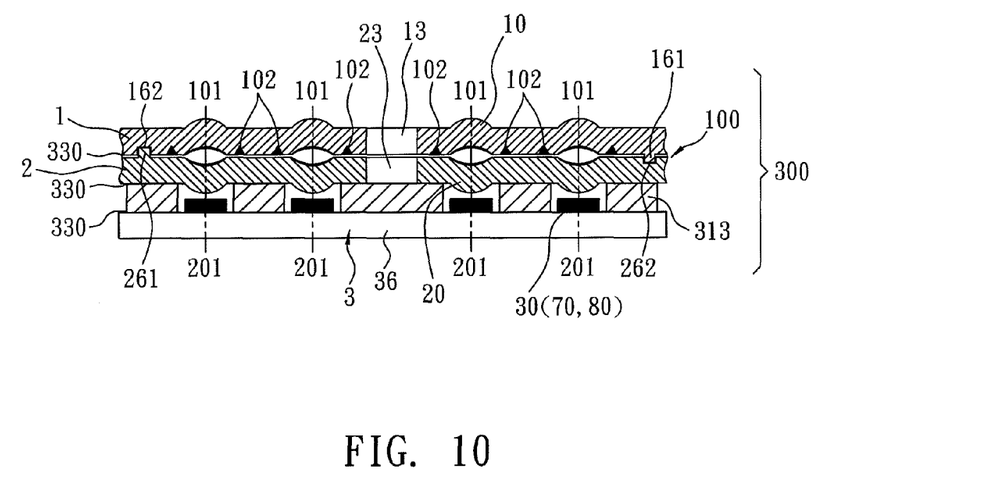
FIG. 10 is a schematic drawing showing a further embodiment of a disk-shaped optical lens array according to the present invention.

Refer to FIG. 10, a stacked disk-shaped optical lens array 100 of the present invention includes at least two disk-shaped optical lens arrays 1, 2 fixed and assembled at a preset interval by glue. The disk-shaped optical lens arrays 1 (2) is a round disk with a disk hole 13 (23) on a center thereof produced by resin injection-compression molding, as shown in FIG. 4. The disk-shaped optical lens arrays 1 (2) includes a first optical surface 11 (21) and a second optical surface 12 (22), respectively having optical area and non-optical area. The optical area of the first optical surface 11 (21) and of the second optical surface 12 (22) are corresponding to each other to form a plurality of optical lens elements 10 (20) arranged in an array. At least one glue groove 102 is disposed on a periphery of the non-optical area of at least one disk-shaped optical lens array 1 (2), as shown in FIG. 8. After glue 330 filled in the glue groove 102 curing, the two disk-shaped optical lens arrays 1, 2 are connected and fixed to form a stacked disk-shaped optical lens array 100. Moreover, at least one alignment fixture 16 (15, 17, 18) is arranged at a peripheral of the non-optical area of at least one disk-shaped optical lens arrays 1 (2), as shown from FIG. 5 to FIG. 7. The disk-shaped optical lens arrays 1, 2 are stacked and assembled precisely by the alignment fixture 16 (15, 17, 18) so that an optical axis 101 of each optical lens element 10 are aligned. Furthermore, the shaped of the disk-shaped optical lens array 1(2) is not limited, it can be a round disk or a square disk or other shape according to users' need or designs of resin injection-compression molding molds.

Figure 6:
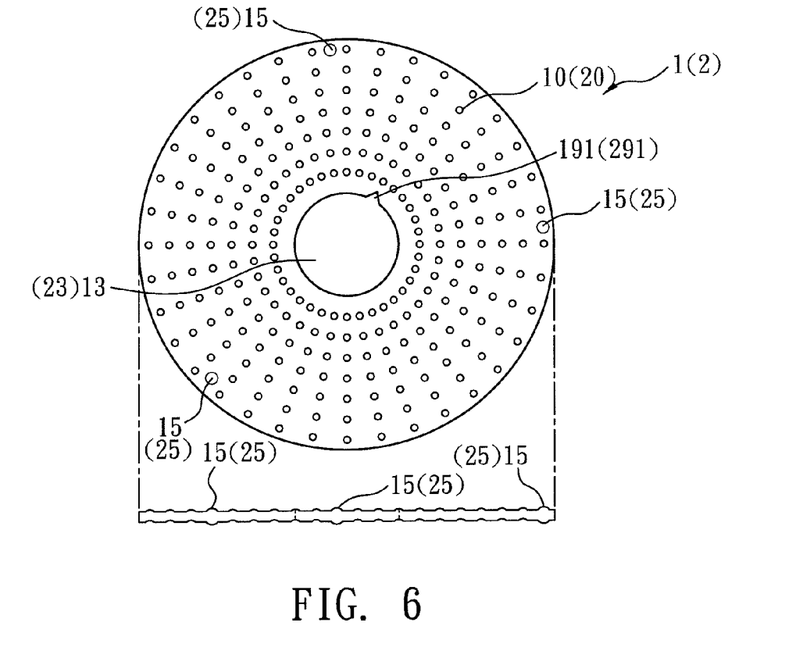
FIG. 6 is a schematic drawing showing an embodiment of a disk-shaped optical lens array with collimating lenses and a guiding notch according to the present invention.
Figure 7:
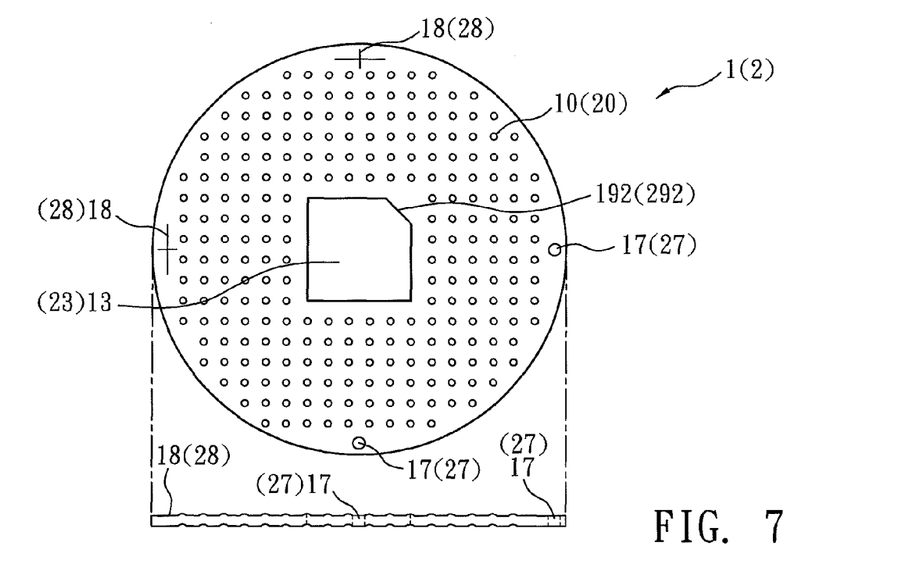
FIG. 7 is a schematic drawing showing an embodiment of a disk-shaped optical lens array with reticles, through holes and a guiding angle according to the present invention.
Figure 8:
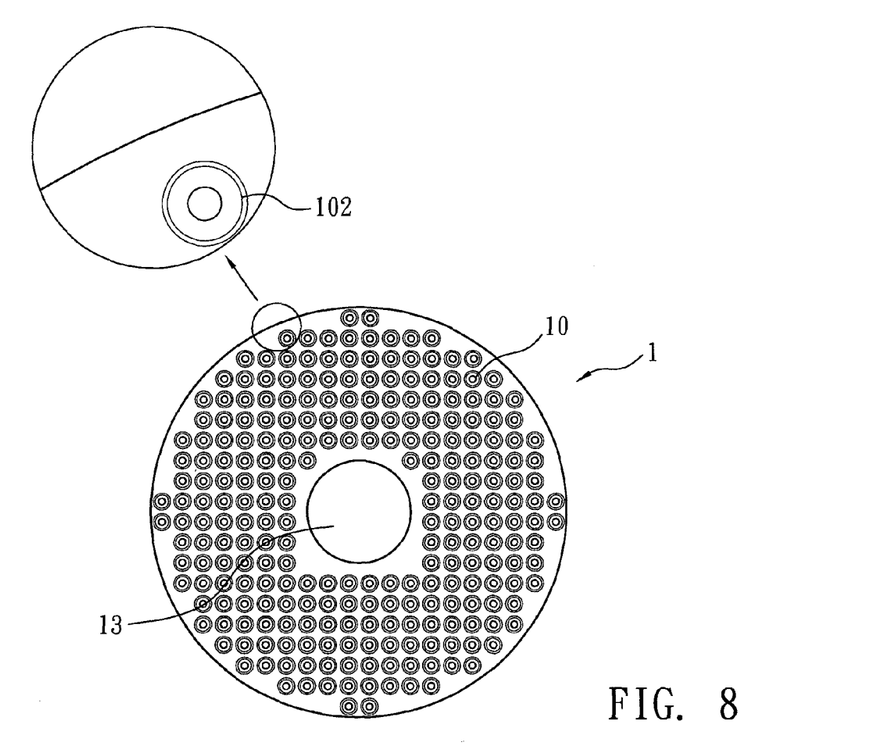
FIG. 8 is a schematic drawing showing an embodiment of a disk-shaped optical lens array with glue grooves according to the present invention.

As shown in FIG. 6 and FIG. 7, in order to located the two disk-shaped optical lens arrays 1, 2 quickly while stacking and assembling, a guiding structure 191 (291) is disposed on the disk hole 13 (23). Or the disk hole 13 (23) is polygonal and one corner of the disk hole 13 (23) is cut to use as a guiding structure 191 (291).

The shape and the type of the glue groove 102 are not limited to round grooves. The shape and type of the alignment fixture 16(15, 17, 18) are not limited to an alignment pin 161, an alignment cavity 162, a collimating lens 15, a through hole 17 or a reticle 18 etc. The optical lens element is not restricted in optical lenses, spacers, apertures, cover glasses, infra-red (IR) cur glasses, image capture devices, photoelectric devices, printed circuit boards (PCB) etc. Similarly, the guiding structure is not limited to the guiding notch 191(291), the guiding angle 191(291), or polygonal hole.

Refer to FIG. 10, glue 330 is coated on non-optical division of a stacked disk-shaped optical lens array 100 so as to stack and assemble the stacked disk-shaped optical lens array 100 with other optical element arrays 3 to form a stacked disk-shaped lens module array 300. The optical element array 3 includes optical elements 30 arranged in an array and positioned on a disk-shaped substrate 36 while each optical element 30 is corresponding to each optical lens element 10, 20 of the stacked disk-shaped optical lens array 100. The optical elements 30 can be, but not limited to, optical lenses, apertures, spacers, cover glasses, IR cut glasses, image capture devices, photoelectric devices, LED etc.

Figure 13A:
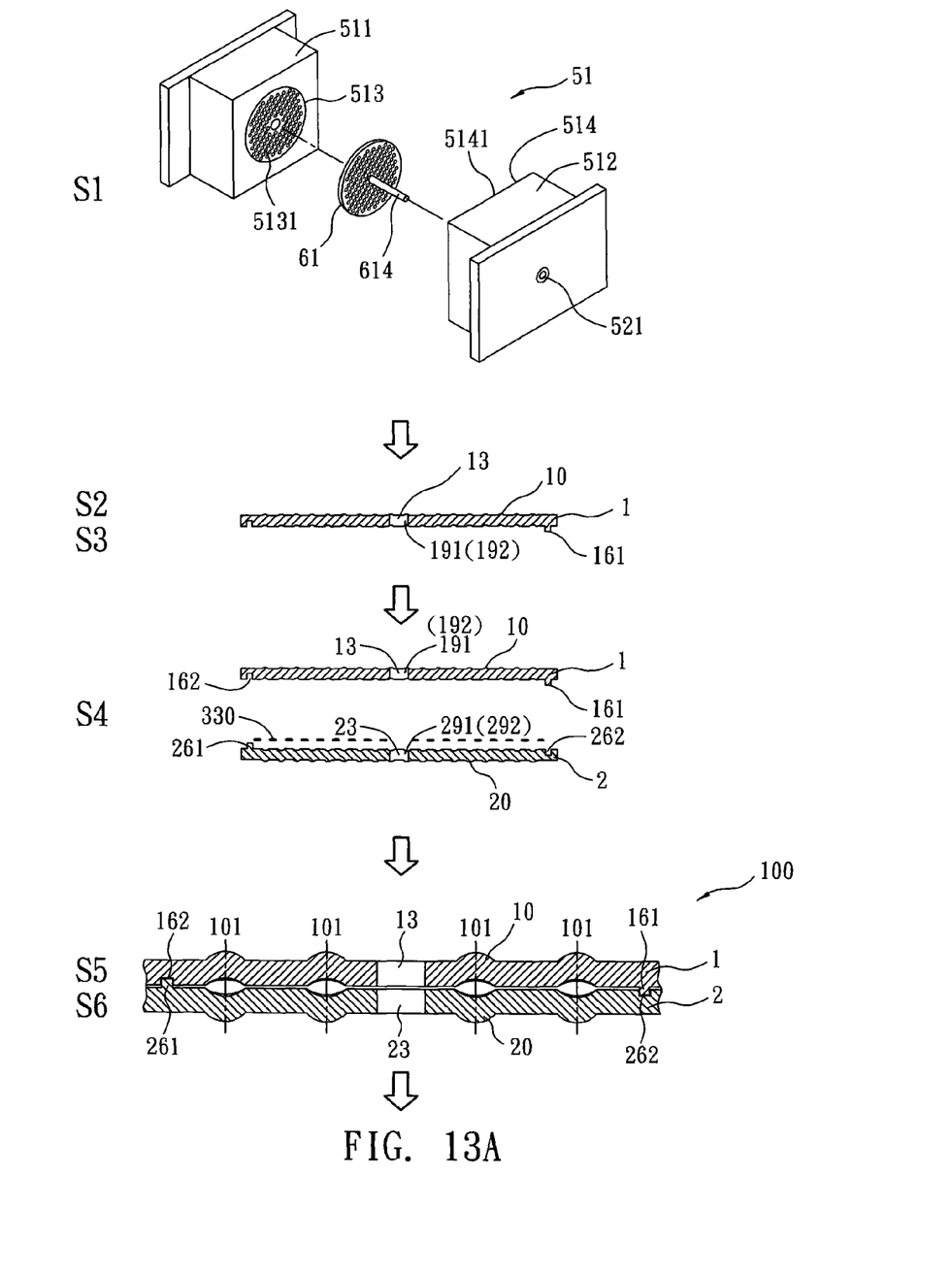
FIGS. 13A and 13B are schematic drawings showing a flow chart of manufacturing a disk-shaped optical lens array and a stacked lens module according to the present invention.
Figure 13B:
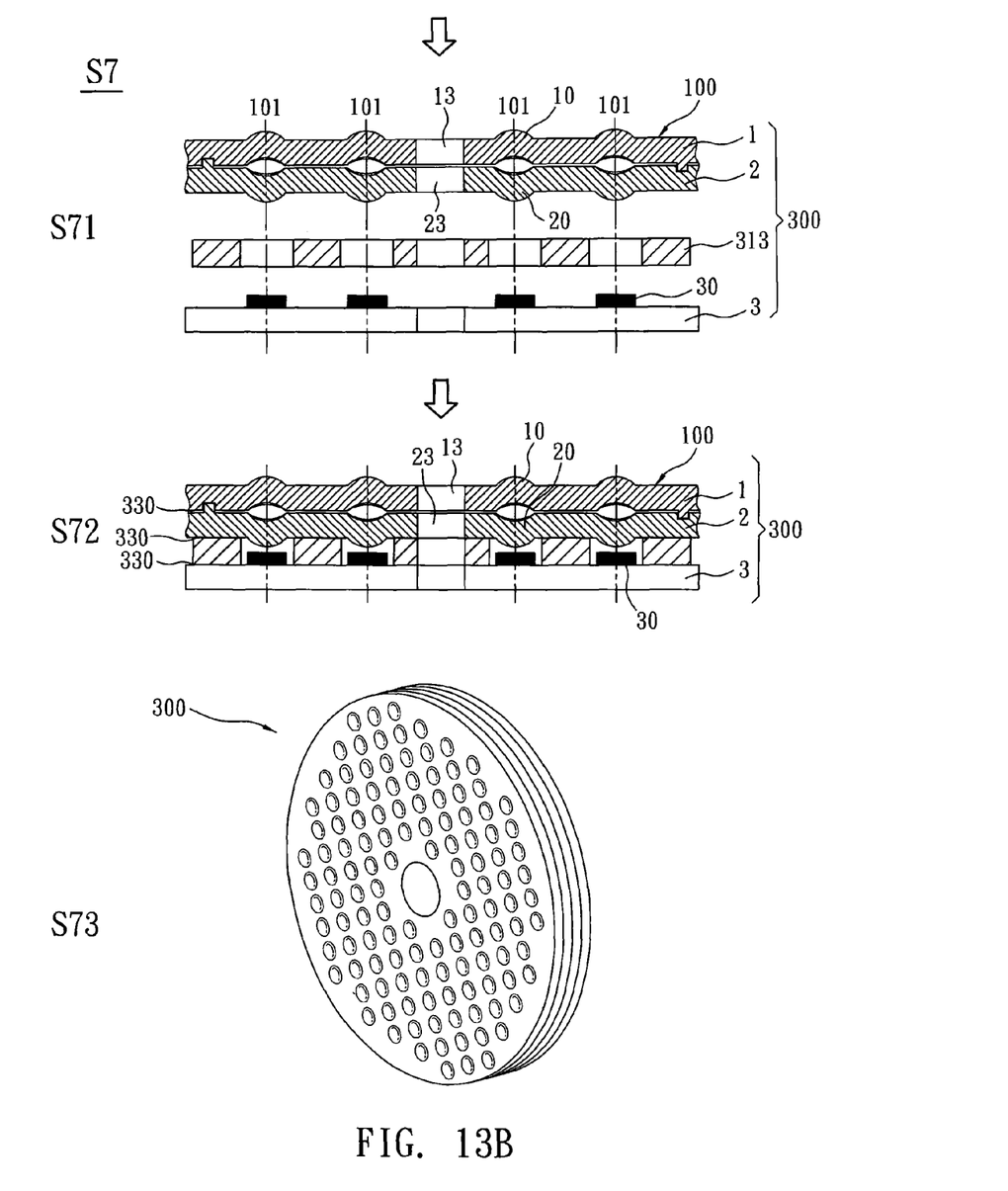

Refer to FIGS. 13A and 13B, a method of manufacturing a stacked disk-shaped optical lens array of the present invention includes following steps:
S1: providing an injection-compression mold 51 having an upper mold 511 and a lower mold 512 respectively with an upper mold core 513 and a lower mold core 514 as well as corresponding optical molding surfaces so as to form a plurality of optical lens elements 10; the upper mold core 513 and/or the lower mold core 514 is disposed with an alignment fixture molding surfaces 5132, 5142 respectively and a material inlet 521 is arranged at a center of the upper mold 511 or the lower mold 512;
S2: producing a primary product of a disk-shaped optical lens array 61 by resin injection-compression molding and cutting off a down sprue stick 614 of the primary product of a disk-shaped optical lens array 61 to produce a disk-shaped optical lens array 1 with a disk hole 13 and a guiding structure 191(192); a non-optical area of the disk-shaped optical lens array 1 is arranged with glue grooves and/or alignment fixtures 161;
S3: producing another disk-shaped optical lens array 2 by the above steps and the disk-shaped optical lens array 2 can be without the glue groove (102);
S4: coating glue 330 on the glue groove (102) of two adjacent disk-shaped optical lens arrays 1, 2 and then stack and assemble the two disk-shaped optical lens arrays 1, 2 by guiding structures 191(192), 291 (292);
S5: aligning optical axes 101 of two adjacent disk-shaped optical lens arrays 1, 2 by the corresponding alignment fixtures 161(162), 262(261) so that each optical lens element 10, 20 is aligned with optical center;
S6: curing the glue 330 to form a stacked disk-shaped optical lens array 100;

Thereby at least tow disk-shaped optical lens arrays 1, 2 are assembled precisely so as to form a stacked disk-shaped optical lens array 100 with precise-aligned optical axes 101.

The method further includes following step to produce a stacked disk-shaped lens module array:
S7: coat glue on non-optical division of a stacked disk-shaped optical lens array 100 to assemble with a disk-shaped optical element array 3 and/or a spacer array 313 in a stacked way and cure the glue (330) so as to produce a stacked disk-shaped lens module array 300 having the optical element array 3 and/or the spacer array 313.

The method of manufacturing a stacked disk-shaped lens module array (the step S7) consists of following steps:
S71: provide a stacked disk-shaped optical lens array 100;
S72: prepare a disk-shaped substrate 36 and arrange a plurality of optical elements (30) in an array on the disk-shaped substrate 36, corresponding to each optical lens 10 (20) of a stacked disk-shaped optical lens array 100 so as to form an optical element array 3;
S73: coat non-optical division of the stacked disk-shaped optical lens array 100 with glue 330 for assembling and connecting to the optical element array 3 in a stacked way and after curing of the glue 330, a stacked disk-shaped lens module array 300 having optical elements is produced.

Embodiment 1

Refer to FIG. 5, FIG. 8, FIG. 9, FIG. 10, FIGS. 13A and 13B, this embodiment is a stacked disk-shaped optical lens array 100 with an alignment fixture 16, having a first and a second disk-shaped optical lens arrays 1, 2. A primary product 61 of disk-shaped optical lens arrays is produced by a resin injection-compression molding and then a down sprue stick 614 of the primary product 61 is cut off to form a central disk hole 13 (23). Thus the first and the second disk-shaped optical lens arrays 1, 2 are formed.

Figure 5:
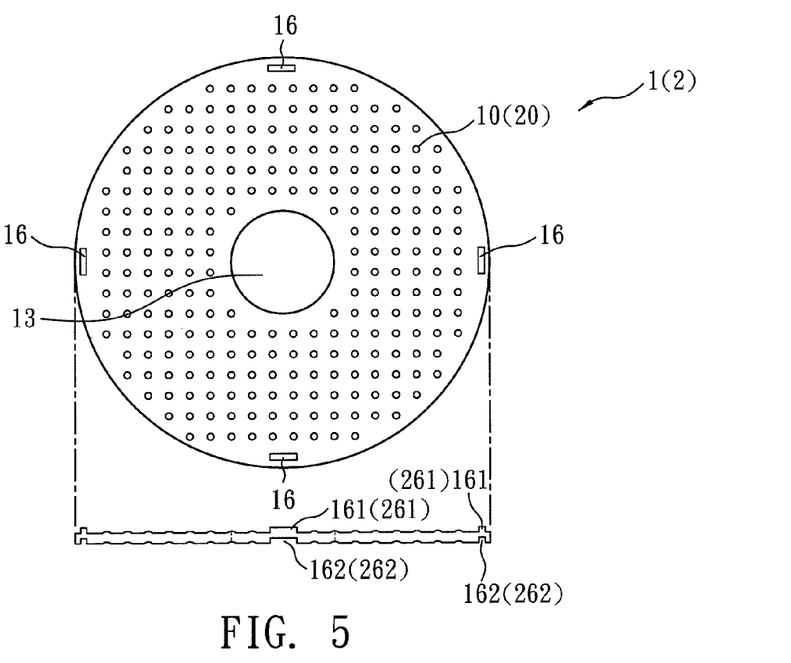
FIG. 5 is a schematic drawing showing an embodiment of a disk-shaped optical lens array with alignment pins and alignment cavities according to the present invention.

The first disk-shaped optical lens array 1 is a round disk with a diameter of 120 mm, having a disk hole 13 on a center thereof, a first and a second optical surfaces 11, 12 with corresponding 244 optical divisions arranged at equal intervals in an array respectively. The diameter of the disk hole 13 is 30 mm. Each optical division forms a meniscus optical lens element 10. Non-optical division on a peripheral of each optical lens element 10 is disposed with a glue groove 102, as shown in FIG. 8. Moreover, Non-optical division on a peripheral of the first disk-shaped optical lens array 1 is disposed with two alignment pins 161 and two alignment cavities 162 respectively separated by 90 degrees (one-quarter of a cycle) and used as alignment fixtures. The alignment pins 161 and the alignment cavities 162 are parallel to the optical axes 101 and located on preset positions, as shown in FIG. 5. In different embodiments, the alignment pin 161 and the alignment cavity 162 can be other types or arranged at different positions.

The second disk-shaped optical lens array 2 is produced by the same method and having 244 meniscus optical lens elements 10 corresponding to the optical lens elements 10 of the first disk-shaped optical lens array 1. The second disk-shaped optical lens array 2 can be without the glue groove 102. Moreover, its non-optical division on the peripheral is arranged with two alignment cavities 262 and two alignment pins 261 as alignment fixtures, respectively corresponding to the alignment pins 161 and the alignment cavities 162 of the first disk-shaped optical lens array 1.

Refer to the steps S4, S5, and S6, while stacking and assembling the first disk-shaped optical lens array 1 and the second disk-shaped optical lens array 2, use a dispensing system (glue dispenser) to coat glue 330 over the glue groove 102 of the first disk-shaped optical lens array 1. The materials of the glue 330 are not limited but thermosetting glue or UV glue is preferred for optical systems. In this embodiment, thermosetting glue is used. Then by the alignment fixtures between the two disk-shaped optical lens arrays 1, 2 connecting with each other such as the alignment pins 161 and the alignment cavities connecting with the corresponding alignment cavities 262 and the alignment pins 261 respectively, the optical axis 101, 201 of each optical lens element 10, 20 are aligned after being stacked and assembled so as to form a stacked disk-shaped optical lens array 100 having two sets of 244 meniscus optical lens elements 10, 20 assembled precisely.

Refer to FIG. 10, the stacked disk-shaped optical lens array 100 is further stacked with an optical element array 3. In this embodiment, an optical lens array 100 consists of the stacked optical lens array (100) formed by the first and the second disk-shaped optical lens arrays 1, 2, an optical element array 3 and a spacer array 313. The optical element array 3 is formed by a number of 244 optical elements 30 (such as image capture devices 30) arranged in an array and located on a disk-shaped substrate (such as a circuit board). Each optical element 30 is corresponding to each optical lens element 10, 20. The spacer array 313 is produced by an opaque plastic plate with a certain thickness and having 244 through holes. The spacer array 313 keeps designed air spacing between the optical lens element 20 and the optical element 30. While being stacked and assembled, the first and the second disk-shaped optical lens arrays 1, 2 are firstly stacked to form a stacked disk-shaped optical lens array (100). Then coat glue 330 on two surfaces of the spacer array 313 or coat glue 330 on a surface of the stacked disk-shaped optical lens array and a surface of the optical element array 3 that are facing each other. Then the stacked disk-shaped optical lens array, the spacer array 313 and the optical element array 3 are stacked in turn. The optical element array 3 and the optical axis 101 are aligned. After the glue 330 being cured in an oven, a stacked disk-shaped lens module array 300 with 244 optical lenses is produced.

Figure 9:
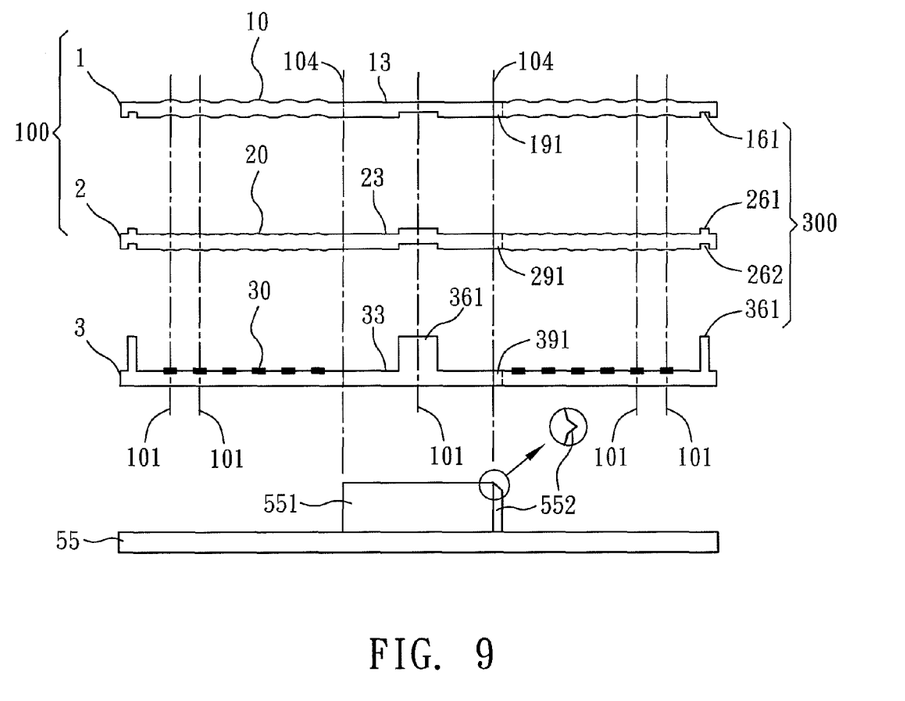
FIG. 9 is a schematic drawing showing assembling of an embodiment of a disk-shaped optical lens array according to the present invention.

Refer to FIG. 9, another stacking way of the embodiment is revealed. The non-optical division of the optical element array 3 is disposed with four alignment pins 361 used as alignment fixtures while the first and the second disk-shaped optical lens array 1, 2 respectively is arranged with a guiding structure 191, 291. As shown in FIG. 6, a guiding structure 191 in the form of a guiding notch is disclosed. The disk hole 13 (23) and the guiding structure 191 (291) are formed by cutting the down sprue stick 614 of the primary product 61 of disk-shaped optical lens arrays. The diameter of the disk hole 13 (23) is 30 mm and the distance from an apex angle to the periphery of the disk hole 13 (23) is 0.8 mm. The second disk-shaped optical lens array 2 is disposed with four alignment cavities 262 used as alignment fixtures that are corresponding to and assembled with the alignment pins 361 of the optical element array 3. Moreover, the height of the alignment pin 361 is pre-designed so that designed air spacing between each optical lens element 20 of the second disk-shaped optical lens array 2 and each image capture device 30 of the optical element array 3 is maintained after the alignment pins 361 being assembled with the alignment cavities 262.

Refer to FIG. 9, while stacking and assembling, the non-optical divisions of the first and the second disk-shaped optical lens arrays 1, 2 and the optical element array 3 are coated with glue 330 and then are set into an assembly fixture 55. The assembly fixture 55 is disposed with a disk-hole assembly pole 551 which is with a disk-hole alignment cam 552 so as to correspond and assemble with the guiding structure 191(291, 391) of the disk hole 13(23, 33) of the optical element array 3. By the disk-hole assembly pole 551 and the disk-hole alignment cam 552 of the assembly fixture 55, the first and the second disk-shaped optical lens arrays 1, 2 and the optical element array 3 are initially aligned along a disk hole guiding line 104 and this favors following precise alignment. Thus the assembling time is shortened and the assembling efficiency is improved.

For precise alignment, the first and the second disk-shaped optical lens arrays 1, 2 and the optical element array 3 are aligned and assembled by alignment fixtures 162, 261, 262, 361 so that optical axes 101 of each optical lens element 10, 20 and each image capture device 30 are aligned. After the glue 330 being cured in an oven, a stacked disk-shaped lens module array 300 with 244 optical lens elements is produced.

Embodiment 2

Figure 12:
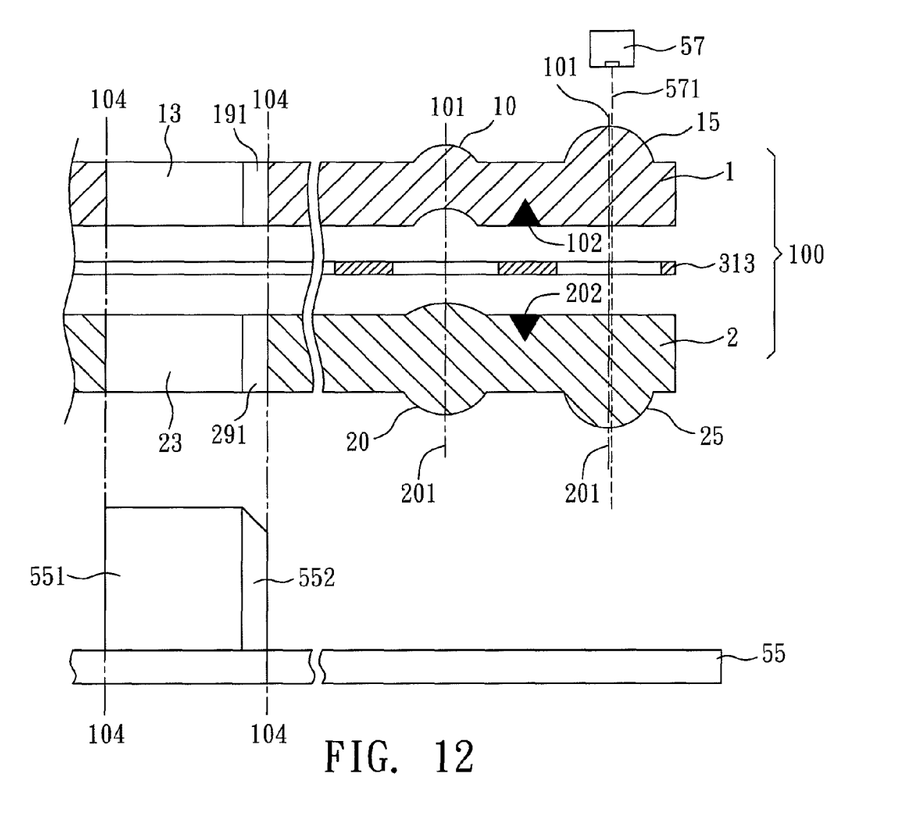
FIG. 12 is a schematic drawing showing an embodiment of a disk-shaped optical lens array in which optical axes are aligned by collimating lenses according to the present invention.

Refer to FIG. 6, FIG. 12, a stacked disk-shaped optical lens array 100 of this embodiment includes an alignment fixture 15(25) that is a collimating lens, a disk hole 13(23) arranged with a guiding structure 191 (291) (guiding notch), a first disk-shaped optical lens array 1 and a second disk-shaped optical lens array 2.

The first and the second disk-shaped optical lens arrays 1, 2 produced by the same method in the embodiment one respectively include 249 meniscus lens elements 10 and 249 bi-convex lens elements 20 arranged at equal intervals and the optical lens elements 10, 20 are corresponding to each other. The optical axes 101, 201 of the optical lens elements 10, 20 are aligned and arranged with an equal interval. The first and the second disk-shaped optical lens arrays 1, 2 are round disks with a diameter of 120 mm, each having a disk hole 13, 23 on a center thereof, and a notch-type guiding structure 191, 291. The disk hole 13, 23 and the guiding structure 191, 291 are formed by removing a down sprue stick 614 from a primary product of a disk-shaped optical lens array 61. The diameter of the disk hole 13, 23 is 30 mm and the distance between the apex angle of the guiding structure 191, 291 and the peripheral of the disk hole 13, 23 is 0.8 mm. Moreover, non-optical division on the peripheral of each optical lens element 10, 20 is arranged with a glue groove 102, 202. Three collimating lens type alignment fixtures 15 such as a bi-convex or plano-convex spherical lens element are arranged at 120 degrees around the periphery of the disk-shaped optical lens array. When laser beam passes through the collimating lens (15), it becomes a light beam parallel to the optical axis for calibration. A spacer array 313 is arranged between the first and the second disk-shaped optical lens arrays 1, 2 so as to have designed air spacing between each optical lens element 10 and each optical lens element 20.

While assembling and stacking, the glue grooves 102, 202 of the first and the second disk-shaped optical lens arrays 1, 2 are coated with glue 330 such as UV glue. Then the first disk-shaped optical lens array 1, the spacer array 313 and the second disk-shaped optical lens array 2 are put into an assembly fixture 55 for initial alignment as shown in FIG. 9. The first and the second disk-shaped optical lens arrays 1, 2 and the optical element array 3 are initially aligned along a disk hole guiding line 104 by the disk-hole assembly pole 551 and the disk-hole alignment cam 552 of the assembly fixture 55.

For precise alignment, refer to FIG. 12, a laser alignment system 57 emits a laser beam 571 passing through the collimating lens type alignment fixtures 15, 25 of the first and the second disk-shaped optical lens arrays 1, 2. Then adjust the first and the second disk-shaped optical lens arrays 1, 2 so as to make optical axes 101, 201 of each optical lens element 10, 20 align with each other. That means align with the optical axis 101. Then the glue 330 is cured under UV radiation. After being removed from the assembly fixture 55, a stacked disk-shaped optical lens array 100 with 249 optical lens sets is produced. The optical lens set includes a meniscus lens element, a spacer, and a bi-convex lens element assembled precisely.

Embodiment 3

Figure 11:
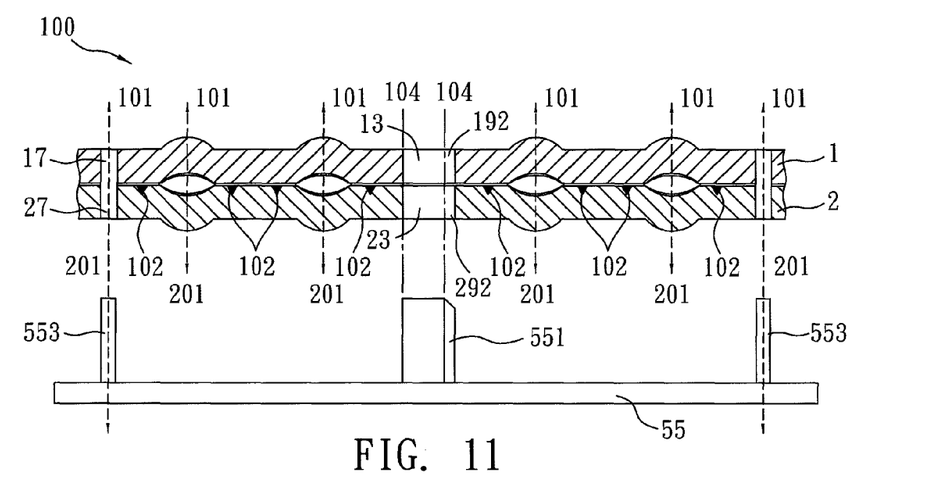
FIG. 11 is a schematic drawing showing a further embodiment of a disk-shaped optical lens array according to the present invention.

Refer to FIG. 7 and FIG. 11, this embodiment is a stacked disk-shaped optical lens array 100 that includes an alignment through hole 17(27), a disk hole 13 (23) with a guiding structure 192,292 (guiding angle), a first disk-shaped optical lens array 1, and a second disk-shaped optical lens array 2.

The first and the second disk-shaped optical lens arrays 1, 2 are produced by the same method mentioned in the embodiment one and embodiment two. A disk hole 13, 23 thereof is a square with a guiding structure 191, 291 that is a guiding angle and is formed by punching a down sprue stick 614 of a primary product of a disk-shaped optical lens array 61. Moreover, non-optical division of the first disk-shaped optical lens array 1 and of the second disk-shaped optical lens array 2 is arranged with at least one alignment through hole 17(27) corresponding to each other and used as alignment fixtures. In FIG. 7, the two alignment through holes 17(27) are disposed at 90 degrees around the peripheral of the disk-shaped optical lens array but not limited. Refer to FIG. 11, the two alignment through holes 17(27) are arranged at 180 degrees around the peripheral of the disk-shaped optical lens array.

While assembling and stacking, the glue groove 202 of the second disk-shaped optical lens array 2 is coated with glue 330 such as thermosetting glue (but not limited to). Then the first disk-shaped optical lens array 1 and the second disk-shaped optical lens array 2 are put into an assembly fixture 55 for initial alignment. The assembly fixture 55 is arranged with a disk-hole assembly pole 551 whose shape and position are corresponding to those of the guiding angle (192,292) of the disk hole 13, 23. Thus the first and the second disk-shaped optical lens arrays 1, 2 are initially aligned along a disk hole guiding line 104 by the disk-hole assembly pole 551 of the assembly fixture 55. Then by two alignment poles 553 of the assembly fixture 55 respectively being inserted into the alignment through holes 17, 27 of the e first and the second disk-shaped optical lens arrays 1, 2, optical axes of each lens element 10, 20 are aligned with each other, aligned with the optical axis 101. After the glue 330 being cured in an oven, a stacked disk-shaped optical lens array 100 is removed from the assembly fixture 55 and produced. By such precise alignment, stacking and assembling, the assembly time is reduced and the assembling efficiency is improved.

Embodiment 4

Refer to FIG. 7, this embodiment is a stacked disk-shaped optical lens array 100 that includes a reticle 18(28) as alignment fixture, a disk hole 13 (23) with a guiding structure 192,292 (guiding angle), a first disk-shaped optical lens array 1, and a second disk-shaped optical lens array 2.

The first and the second disk-shaped optical lens arrays 1, 2 are produced by the same method mentioned in the embodiment three. The difference between this embodiment and the above one is in that the non-optical divisions of the first and the second disk-shaped optical lens arrays 1, 2 are respectively are disposed with reticles 18(28) used as alignment fixture. The reticle 18(28) is formed by hair lines and the two reticles 18(28) of this embodiment can be, but not limited to, arranged at 90 degrees around the periphery of the disk-shaped optical lens array 1(2).

While assembling and stacking, similar to the embodiment three, initial alignment is achieved by the disk hole 13(23) and the guiding angle 192 (292). For precise alignment (refer to the embodiment two and FIG. 12), a laser alignment system 57 is used to emit a laser beam 571 passing through the reticles 18, 28. Then adjust the first and the second disk-shaped optical lens arrays 1, 2 so as to make optical axes 101, 201 of each optical lens element 10, 20 align with each other. That means align with the optical axis 101. After curing of the glue 330 and being removed from the assembly fixture 55, a stacked disk-shaped optical lens array 100 that are assembled precisely is obtained.

Embodiment 5

Refer to FIG. 10, this embodiment is a stacked disk-shaped lens module array 300 including a stacked disk-shaped optical lens array 100 formed by two stacked disk-shaped optical lens arrays 1, 2, an optical element array 3 and a disk-shaped spacer array 313, stacked and assembled with one another. The optical element array 3 is formed by a plurality of (such as a number of 244) optical elements 30 arranged in an array on a disk-shaped substrate 36. In this embodiment, the disk-shaped substrate 36 is a disk-shaped circuit board. Each optical element 30 is corresponding to each optical lens element 10, 20 (a number of 244) arranged in an array of the stacked disk-shaped optical lens array 100 and is disposed on the disk-shaped substrate 36. The disk-shaped spacer array 313 is produced by an opaque plastic piece with a certain thickness and a plurality of (such as 244) through holes. Due to the certain thickness of the disk-shaped spacer array 313, there is designed air spacing between each optical lens element (20) and each image capture device 30.

In this embodiment, the optical element 30 can be LED 70 while the optical lens elements 10, 20 are replaced by LED distributing lenses so as to form a stacked disk-shaped lens module array 300 having a plurality of (such as a number of 244) LED 70. If the optical element 30 is a solar cell 80, the optical lens elements 10, 20 are changed into concentrating lenses that convert solar energy. Thus a stacked disk-shaped lens module array 300 having a plurality of (such as a number of 244) solar cells 80.

The stacked way and precise-alignment of the stacked disk-shaped lens module array 300 of this embodiment with a plurality of (such as 244) optical lens elements are similar to those of the embodiment one. There are two different ways. One stacking way is shown in FIG. 9 and the other is in FIG. 10. Similarly, the stacked disk-shaped lens module array 300 having a plurality of (such as 244) LED 70 or solar cells 80

Embodiment 6

Figures 14, 15:
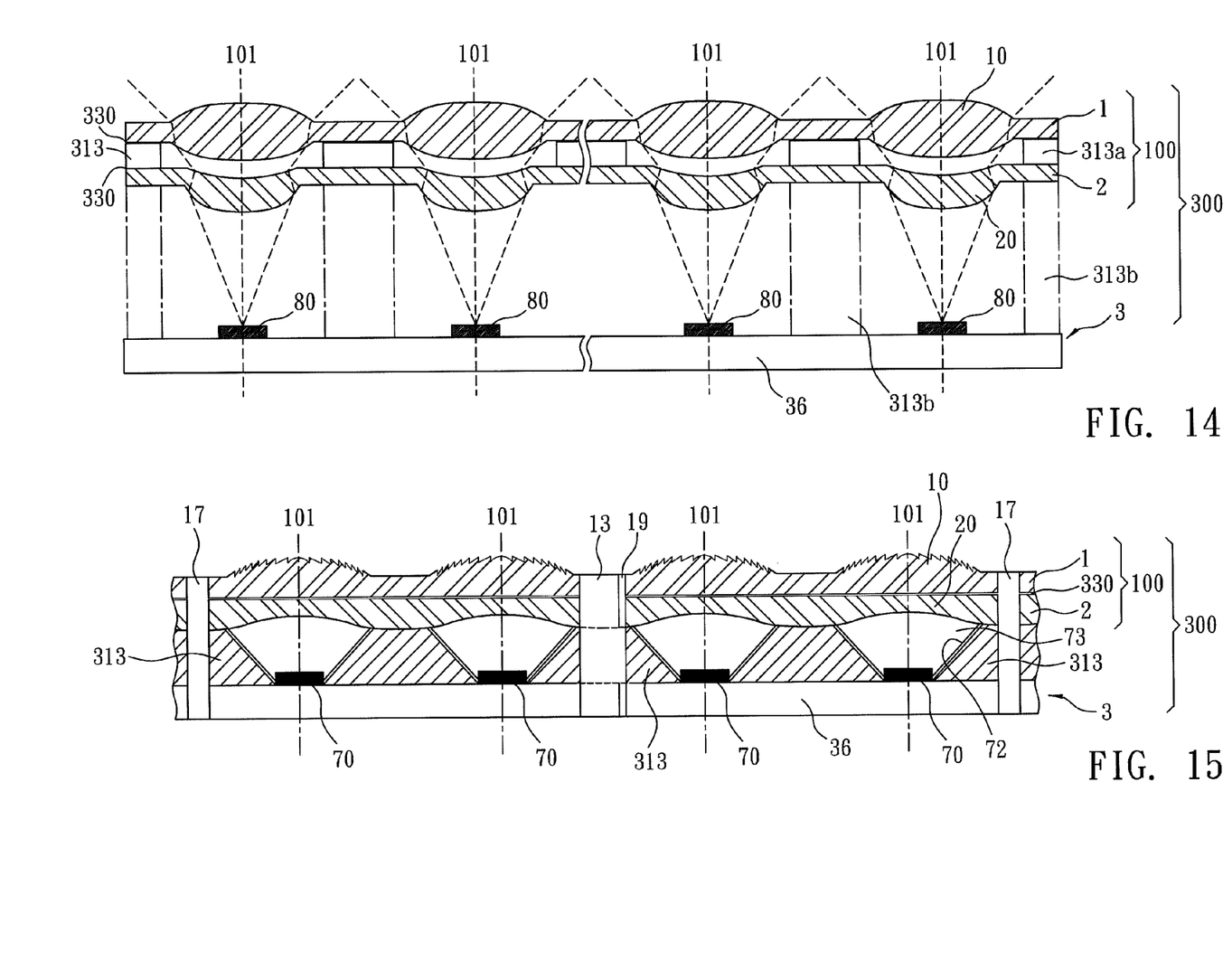
FIG. 14 is a schematic drawing showing a stacked disk-shaped lens module array.
FIG. 15 is a schematic drawing showing another stacked disk-shaped lens module array.

Refer to FIG. 14, this embodiment is a stacked disk-shaped lens module array 300 applied to solar energy conversion systems. A stacked disk-shaped optical lens array 100 is stacked, assembled with a spacer array 313 and an optical element array 3 having solar cells 80 to produce the stacked disk-shaped lens module array 300.

The method of manufacturing the stacked disk-shaped lens module array 300 of this embodiment is similar to that of the embodiment five. The stacked disk-shaped optical lens array 100 consists of a first disk-shaped optical lens array 1 having 120 bi-convex optical lens elements 10, a spacer array 313a and a second disk-shaped optical lens array 2 having 120 corresponding meniscus lens elements 20. The 120 optical lens elements 10 and optical lens elements 20 are arranged at equal intervals and the arrangement is similar to FIG. 5 while the array density is lower. The spacer array 313a is a disk-shaped heat-resistant plastic sheet with 120 through holes and its thickness is preset so as to have air spacing between the optical lens element 10 and the optical lens element 20. While assembling, both sides of the spacer array 313a are coated with glue 330. Then optical axes 101 of the first disk-shaped optical lens array 1 and the second disk-shaped optical lens array 2 are aligned by alignment fixtures (not shown in figure) and both disk-shaped optical lens arrays 1, 2 are stacked and assembled with the spacer array 313a. After curing of the glue 330, the stacked disk-shaped optical lens array 100 is produced.

The optical element array 3 includes a disk-shaped heat-resistant substrate 36 disposed with 120 solar cells 80 that are corresponding to the optical lens elements 10, 20 of the stacked disk-shaped optical lens array 100. A spacer array 313b is a disk-shaped metal support with 120 through holes and its thickness is preset so as to have air spacing between the optical lens element 20 and the solar cell 80. While assembling, firstly fix the spacer array 313b and the stacked disk-shaped optical lens array 100, and then adjust the optical element array 3 so as to make a center of the solar cell 80 align with the optical axis 101 of the stacked disk-shaped optical lens array 100. Thus a stacked disk-shaped lens module array 300 used in solar energy conversion systems is produced after fixing. Thereby the lens modules are produced easily and quickly, forming large-scale, mass production, and the cost is reduced dramatically.

For maintenance of solar energy conversion systems, generally the stacked disk-shaped optical lens array 100, the spacer array 313b and the optical element array 3 are fixed by metal fixtures, instead of glue. Moreover, the stacked disk-shaped lens module array 300 is fixed and arranged at the solar energy conversion system by a central disk hole thereof (not shown in figure), normally fixed on a solar tracking controller of the solar energy conversion system.

Embodiment 7

Refer to FIG. 15, this embodiment is a stacked disk-shaped lens module array 300 applied to a large LED lighting system. The system includes a plurality of LED arranged in an array and halogen lamps on a center thereof, both used as light sources. The stacked disk-shaped lens module array 300 of the LED light source is produced by a stacked disk-shaped optical lens array 100 of the present invention stacked with a spacer array 313 and an optical element array 3 having a plurality of LED chips 70 arranged in an array.

A method for manufacturing the stacked disk-shaped lens module array 300 of the present invention is similar to that of the embodiment five. The stacked disk-shaped lens module array 300 consists of a stacked disk-shaped optical lens array 100, a spacer array 313 and an optical element array 3 having a plurality of (such as a number of 16) LED chips 70. The stacked disk-shaped optical lens array 100 is produced by a first and a second disk-shaped optical lens arrays 1, 2, respectively having 16 plano-convex lens elements 10 (whose convex surface is a Fresnel optical surface) and 16 plano-concave lens elements 20. The 16 optical elements 10 (20) are radially arranged at an equal interval and the arrangement is as shown in FIG. 4 but with lower array density. While assembling, coat glue 330 on an interface between the first disk-shaped optical lens array 1 and the second disk-shaped optical lens array 2. Then align the optical axis 101 by alignment through holes 17, 27 of alignment fixtures, as the method of the embodiment three. After curing of the glue 330, a stacked disk-shaped optical lens array 100 is formed.

The optical element array 3 is a disk-shaped heat-resistant substrate 36 disposed with 16 LED chips 70 that are corresponding to the optical lens elements 10, 20 of the stacked disk-shaped optical lens array 100. A spacer array 313 is a disk-shaped metal support with 16 through holes and its thickness is preset so as to have air spacing between the optical lens element 20 and the LED chip. A slant surface of the spacer array 313 is pre-electroplated with a reflective layer 72 so as to reflect light emitting from the LED chip 70 to the optical lens elements 10, 20 for improving lighting efficiency. While assembling, firstly fix the spacer array 313 and the stacked disk-shaped optical lens array 100, and then adjust the optical element array 3 so as to make a center of each LED chip 70 align with the optical axis 101 of the stacked disk-shaped optical lens array 100. Next fill transparent silicon gel 73 into a space among the stacked disk-shaped optical lens array 100, the spacer array 313 and the optical element array 3 (also the space above each LED chip 70). Thereby these three arrays are fixed to form a stacked disk-shaped lens module array 300 used in a LED lighting system. The lens modules are produced easily and quickly, forming large-scale, mass production, and the cost is reduced dramatically. The central disk hole13 of the stacked disk-shaped lens module array 300 can be used to mount halogen lamps.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method of manufacturing a stacked disk-shaped optical lens array comprising the steps of:
    S1: providing an injection-compression mold having an upper mold and a lower mold respectively with optical molding surfaces; the upper mold and/or the lower mold is disposed with at least one alignment fixture molding surface respectively and a material inlet is arranged at a center of the upper mold or the lower mold;
    S2: producing a primary product of disk-shaped optical lens array by resin injection-compression molding and cutting off a down sprue stick of the primary product of a disk-shaped optical lens array to produce a disk-shaped optical lens array; the disk-shaped optical lens array having a plurality of optical lens elements formed on optical division while non-optical division of the disk-shaped optical lens array is arranged with at least one glue groove and at least one alignment fixtures; a disk hole is formed at a center of the disk-shaped optical lens array;
    S3: producing another disk-shaped optical lens array by the above steps and this disk-shaped optical lens array is without the glue groove;

S4: coating glue on the glue groove of the two disk-shaped optical lens arrays for connecting and assembling the two disk-shaped optical lens arrays;

S5: aligning optical axes of the two disk-shaped optical lens arrays by the alignment fixture so that the plurality of optical lens elements of the two disk-shaped optical lens arrays is aligned with optical center;

S6: curing the glue to form a stacked disk-shaped optical lens array.

2. The method as claimed in claim 1, wherein in the step of cutting off a down sprue stick of the primary product of a disk-shaped optical lens array, the disk hole and at least one guiding structure are formed on the disk-shaped optical lens array; and in the step of coating glue on the glue groove of the two disk-shaped optical lens arrays for connecting and assembling the two disk-shaped optical lens arrays, the two disk-shaped optical lens arrays are stacked and assembled by the guiding structure.

3. A method for manufacturing a stacked disk-shaped lens module array comprising the steps of:

S71: providing a stacked disk-shaped optical lens array produced by the method claimed in claim 1, and having a plurality of optical lens elements arranged in an array form;

S72: providing an optical element array that includes a disk-shaped substrate and a plurality of optical elements while the optical elements are arranged in an array form on the disk-shaped substrate, and corresponding to plurality of optical lens elements of the stacked disk-shaped optical lens array;

S73: coating glue on non-optical division of the stacked disk-shaped optical lens array to assemble the stacked disk-shaped optical lens array with the optical element array for producing a stacked disk-shaped lens module array having the optical element array after curing of the glue.

\* \* \* \* \*